United States Patent
Bruce (10) Patent No.: US 7,497,270 B2
(45) Date of Patent: Mar. 3, 2009

(54) VARIABLE WAVE COULTER

(76) Inventor: Douglas G. Bruce, 2223 Fourth St., Perry, IA (US) 50220

( * ) Notice: Subject to any disclaimer, the term of this patent is extended or adjusted under 35 U.S.C. 154(b) by 514 days.

(21) Appl. No.: 11/237,142

(22) Filed: Sep. 28, 2005

(65) Prior Publication Data

US 2007/0068690 A1    Mar. 29, 2007

(51) Int. Cl.
*A01B 59/00* (2006.01)
(52) U.S. Cl. .......................... 172/604; 172/765
(58) Field of Classification Search ............ 172/531, 172/532, 537, 539, 540, 555, 603, 604, 765; 111/63, 66; D15/29; 301/63.101
See application file for complete search history.

(56) References Cited

U.S. PATENT DOCUMENTS

| | | | | | |
|---|---|---|---|---|---|
| 2,575,321 | A | * | 11/1951 | Traver | 172/555 |
| 2,908,338 | A | * | 10/1959 | Hanrahan | 172/555 |
| 3,559,748 | A | * | 2/1971 | Shelton | 172/604 |
| 3,623,577 | A | * | 11/1971 | Scharlack | 188/71.6 |
| 3,889,430 | A | * | 6/1975 | Scandaletos | 451/546 |
| 4,538,688 | A | * | 9/1985 | Szucs et al. | 172/555 |
| 5,473,999 | A | * | 12/1995 | Rawson et al. | 111/127 |
| 5,649,602 | A | | 7/1997 | Bruce | |
| 6,523,618 | B2 | * | 2/2003 | Firdaus | 172/540 |
| 7,143,838 | B2 | * | 12/2006 | Piccat | 172/604 |
| 2002/0038620 | A1 | * | 4/2002 | Gentilhomme | 111/166 |

* cited by examiner

Primary Examiner—Thomas B Will
Assistant Examiner—Jamie L Mcgowan
(74) Attorney, Agent, or Firm—Sturm & Fix LLP (57) ABSTRACT

The present invention provides a wavy coulter having a plurality of variable-amplitude waves, each wave defined by a crest and an adjacent valley. The coulter is mounted on an implement such that a leading peripheral edge of the coulter rotates in a downward direction as it enters the soil. The waves having larger amplitudes of deviation from flat provide a driving force for turning the variable wave coulter. The waves having smaller amplitudes of deviation from flat provide penetration into the soil. The result is a coulter that is forgiving in both wet and dry soil conditions.

34 Claims, 9 Drawing Sheets

VARIABLE WAVE COULTER

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

This invention relates to tillage tools and, more particularly, to a wavy coulter.

2. Background Art

Wavy coulters are presently used ahead of no-till implements—such as a planter—to fracture a narrow band of soil to prepare the soil to receive the no-till implement. The coulters are set at a penetrating depth of about four inches, and the amplitude of the wave from crest-to-valley is about one to two inches and generally defines the width of the band. All crests and all valleys deviate from a single plane by the same amount. These traditional wavy coulters are designed for only one speed, and if they go faster they throw great amounts of dirt.

The crests and valleys on presently available wavy coulters are positioned to extend out from the center of the coulter in a line generally coincident with the radius of the coulter. As each wave enters the soil, the line of the wave enters the soil at an angle with respect to vertical.

A wavy coulter was disclosed in U.S. Pat. No. 5,649,602, which is hereby incorporated by reference. In this invention, the waves of the coulter extend back from the peripheral edge of the coulter in respective adjacent lines disposed at a predetermined acute angle with respect to the radius of the coulter body. The maximum amplitudes of all the periodic deviations from flat are equal. It has been shown, however, that varying the maximum amplitudes of the periodic deviations from flat provides advantages over this prior art.

Herein, deviation from flat is defined by a distance from a plane in which the periphery of a flat coulter resides.

There is, therefore, a need for an improved wavy coulter wherein the maximum amplitudes of the set of waves vary.

BRIEF SUMMARY OF THE INVENTION

The present invention provides a wavy coulter having a plurality of maximum amplitudes in the waves, each wave defined by a crest and an adjacent valley. Each crest and valley may extend back from the peripheral edge of the coulter in respective adjacent lines disposed at a predetermined acute angle with respect to the radius of the coulter body, or the lines may be substantially radial. In the first case, the coulter is mounted on an implement frame such that a leading peripheral edge of the coulter rotates in a downward direction as it enters the soil, and the lines of each crest and valley enter the soil at a nearly vertical orientation. A uniform narrow band of fractured soil is, thus, prepared by the coulter since soil compaction is minimized. In the latter case, as each wave enters the soil, the line of the wave enters the soil at an angle with respect to vertical. Each wave, therefore, tends to occasionally throw lumps of soil to the rear and out of the narrow band in which the variable wavy coulter runs. Either of these modes may be advantageous in different circumstances.

In practice, the waves having smaller amplitudes tend to penetrate the soil, whereas the waves of larger amplitude tend to drive the coulter in its rotation. Together, the plurality of amplitudes provides a system that is more forgiving in either wet or dry soils, and is self cleaning.

An object of the present invention is the provision of an improved wavy coulter.

Another object is to provide a wavy coulter having a plurality of amplitudes for the deviations from flat.

DETAILED DESCRIPTION OF THE INVENTION

Figure 1:
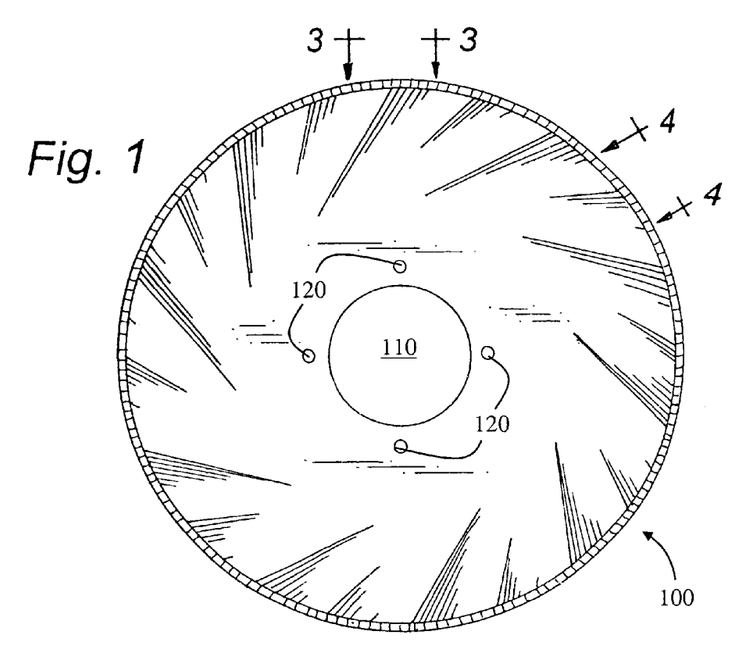
FIG. 1 is a side elevational view of a variable wave coulter of the present invention, having two maximum amplitudes of the deviations from flat.
Figure 5:
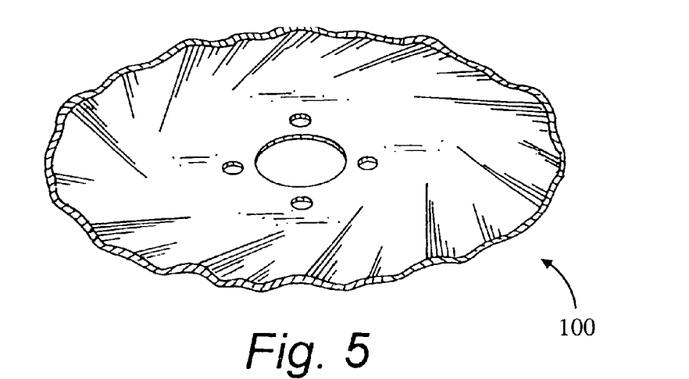
FIG. 5 is a perspective view of the variable wave coulter of the present invention.

Referring now to the drawings, wherein like reference numerals designate identical or corresponding parts throughout the several views, FIGS. 1 and 5 show the variable wave coulter 100 of the present invention. Such a variable wave coulter 100 has a center aperture 110 to fit over a hub on which the variable wave coulter 100 turns, and a plurality of fastener holes 120 for affixing the variable wave coulter 100 to the hub.

Figures 2, 3:
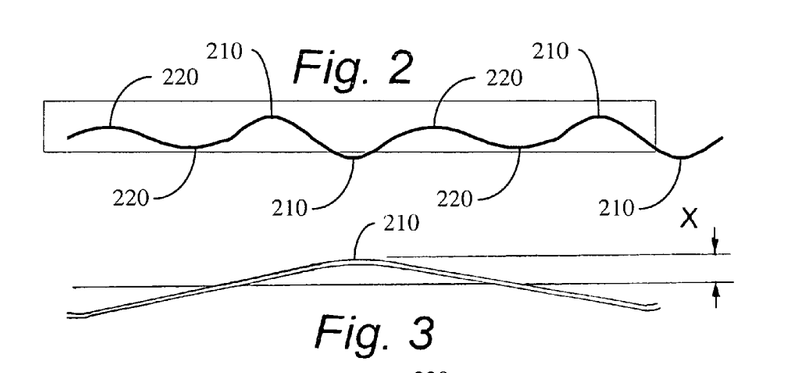
FIG. 2 is a plan view of the variable wave coulter showing the two maximum amplitudes of the deviations from flat.
FIG. 3 is a detail of one half of a wave having a larger amplitude.
Figure 4:
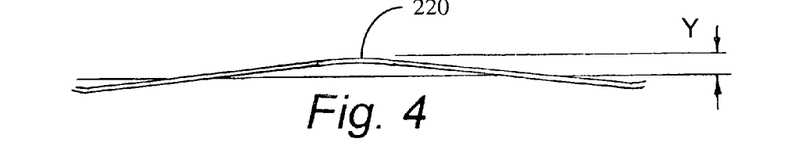
FIG. 4 is a detail of one half of a wave having a smaller amplitude.

In FIG. 2, a portion of the circumference of the variable wave coulter 100 has been "unrolled" and displayed to show the two maximum amplitudes 210, 220 of the deviations from a flat plane. The relative amplitudes may be compared by viewing FIGS. 3 and 4. The smaller maximum amplitude 220 will tend to penetrate the soil more deeply than the larger maximum amplitude 210, whereas the larger maximum amplitude 210 will tend to drive the variable wave coulter 100 in its rotation.

Figure 6:
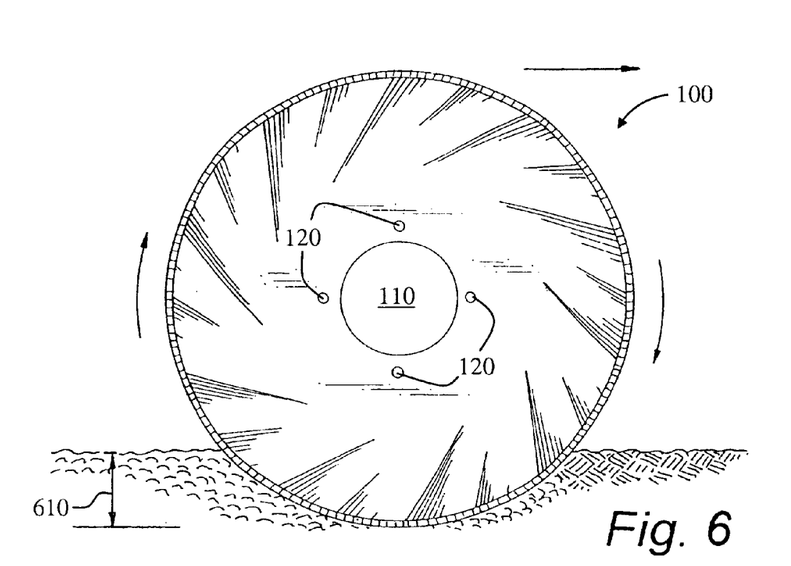
FIG. 6 is a side elevational view of the variable wave coulter shown in operation in soil.
Figure 7:
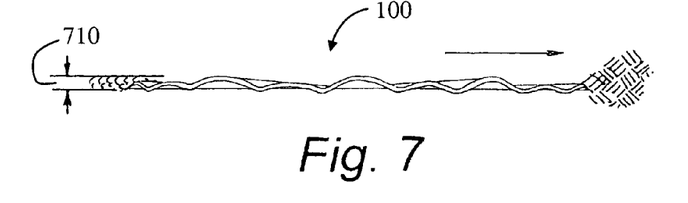
FIG. 7 is a plan view of the variable wave coulter in use.

FIGS. 6 and 7 show the variable wave coulter 100 in use to loosen and generally disturb the soil to the depth 610 shown and for a width 710 shown.

Figure 8:
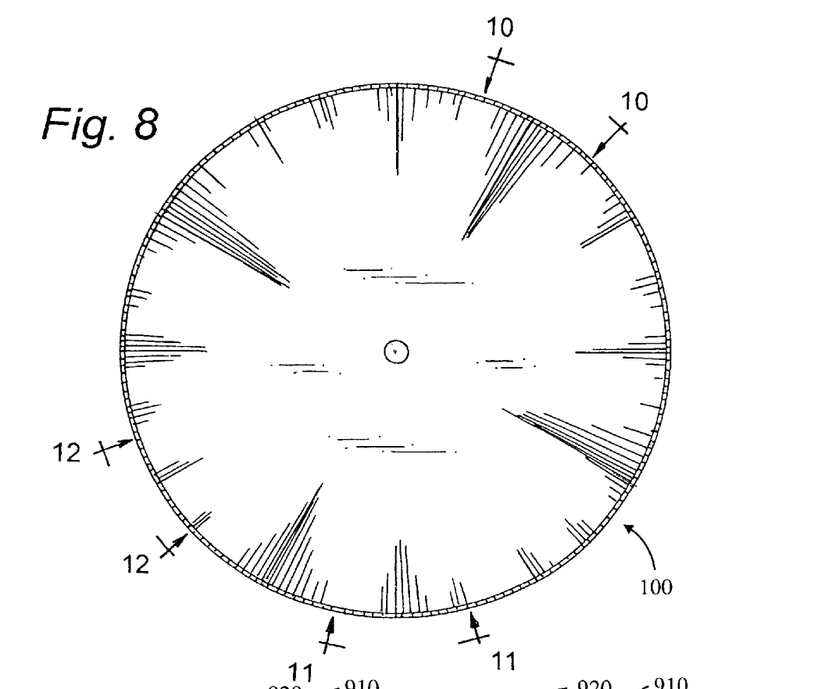
FIG. 8 is a side elevational view of a variable wave coulter having three maximum amplitudes of the deviations from flat.

A second embodiment of the present invention is illustrated in FIGS. 8-15. The variable wave coulter 100 in this embodiment has three maximum amplitudes 910, 920, 930. As can be seen in FIG. 8, this embodiment may be realized by waves having crests and valleys directed in generally radial direction. However, this embodiment is not limited to this configuration, and the crests and valleys may extend back from the peripheral edge of the variable wave coulter in respective adjacent lines disposed at a predetermined acute angle with respect to the radius of the variable wave coulter 100 body as was shown in FIGS. 1, 5 and 6.

Figure 9:
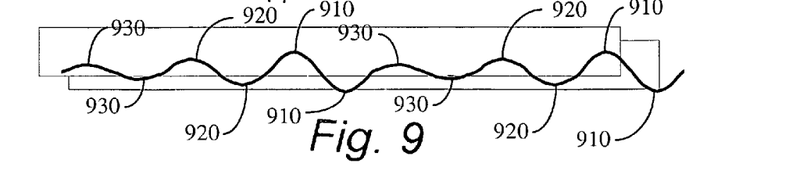
FIG. 9 is a plan view of a variable wave coulter having three maximum amplitudes of the deviations from flat.
Figure 10:
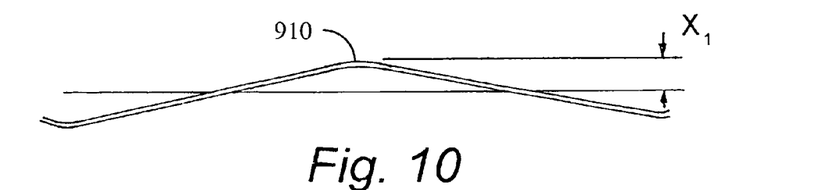
FIG. 10 is a detail of one half of a wave having a larger amplitude.
Figure 11:
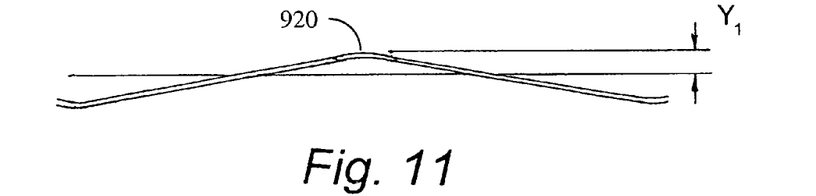
FIG. 11 is a detail of one half of a wave having a medium amplitude.
Figure 12:
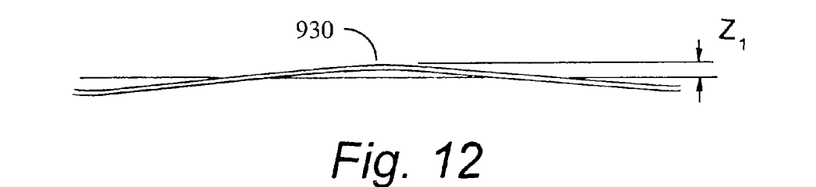
FIG. 12 is a detail of one half of a wave having a smaller amplitude.
Figure 13:
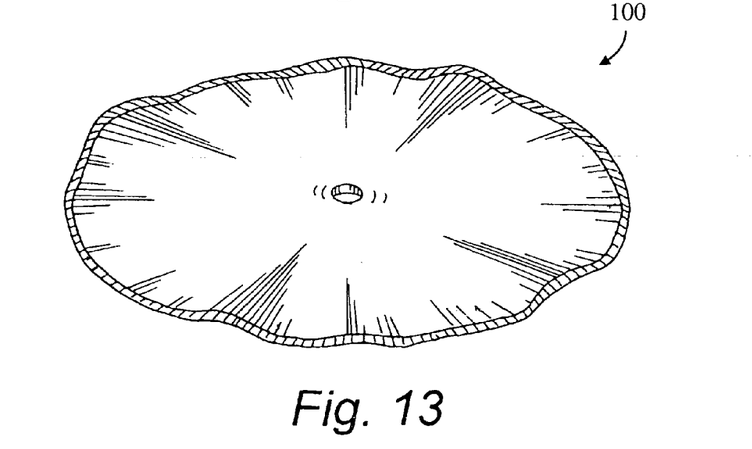
FIG. 13 is a perspective view of the variable wave coulter having three maximum amplitudes of the deviations from flat.

The three maximum amplitudes 910, 920, 930 are clearly seen in FIG. 9 which illustrates a segment of the periphery of the variable wave coulter 100 of this second embodiment. Crests having the largest amplitude 910, the medium amplitude 920, and the smallest amplitude 930 are shown in FIGS. 10-12, respectively.

Figure 14:
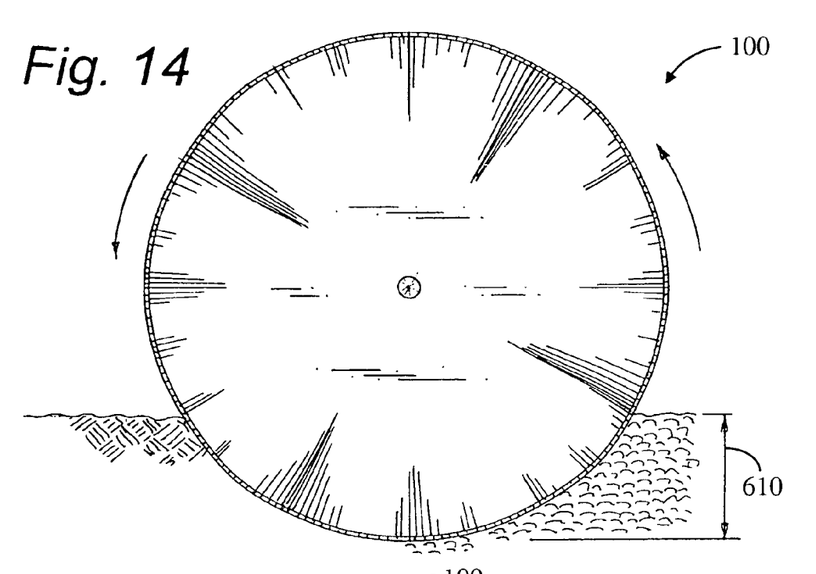
FIG. 14 is a side elevational view of the variable wave coulter having three maximum amplitudes of the deviations from flat shown in operation in soil.
Figure 15:
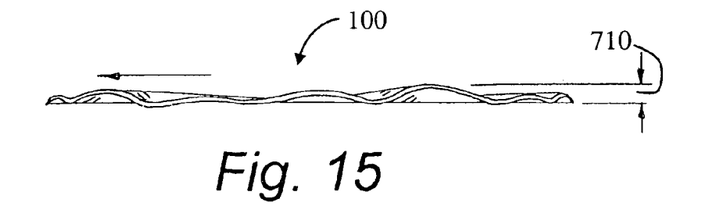
FIG. 15 is a plan view of the variable wave coulter having three maximum amplitudes of the deviations from flat in use.

The variable wave coulter 100 of the second embodiment is shown in FIGS. 14 and 15 in use loosening soil to the depth 610 and width 710 shown.

Figure 16:
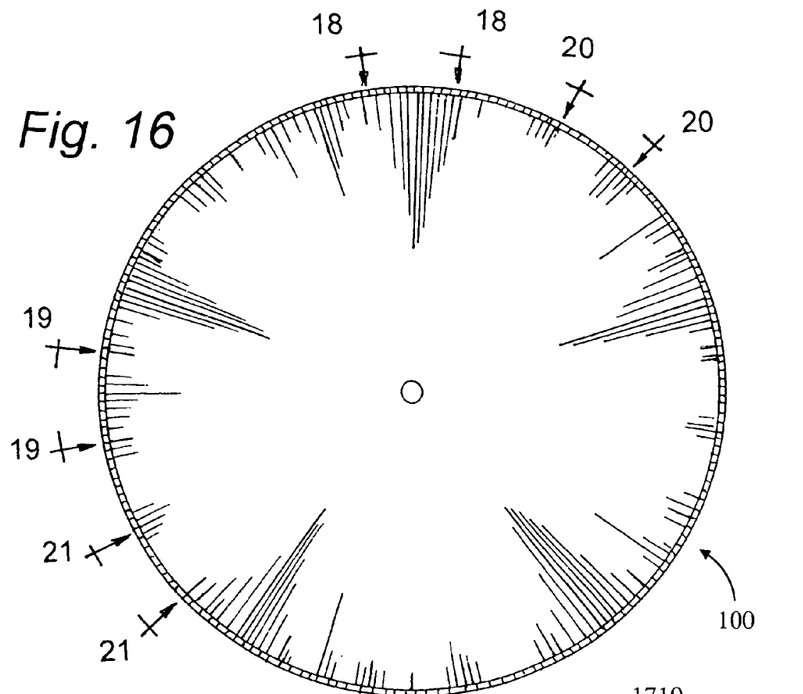
FIG. 16 is a side elevational view of a variable wave coulter having four maximum amplitudes of the deviations from flat.

A third embodiment of the present invention is illustrated in FIGS. 16-24. The variable wave coulter 100 in this embodiment has four maximum amplitudes 1710, 1720, 1730, 1740. As can be seen in FIG. 16, this embodiment may be realized by waves having crests and valleys directed in generally radial direction. However, this embodiment is not limited to this configuration, and the crests and valleys may extend back from the peripheral edge of the variable wave coulter 100 in respective adjacent lines disposed at a predetermined acute angle with respect to the radius of the variable wave coulter 100 body as was shown in FIGS. 1, 5 and 6.

Figure 17:
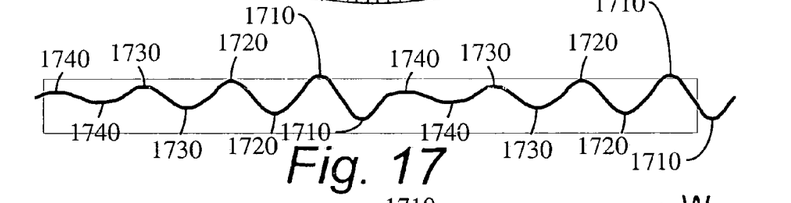
FIG. 17 is a plan view of the variable wave coulter having four maximum amplitudes of the deviations from flat.
Figure 18:
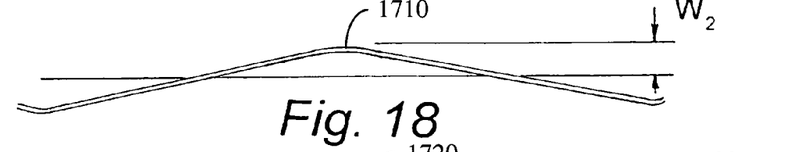
FIG. 18 is a detail of one half of a wave having a larger amplitude.
Figure 19:
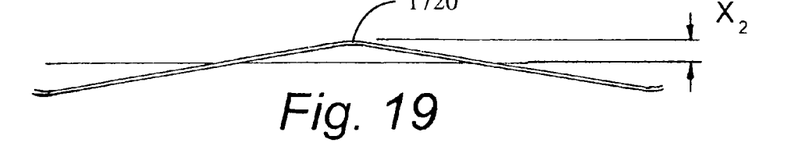
FIG. 19 is a detail of one half of a wave having a medium-large amplitude.
Figure 20:
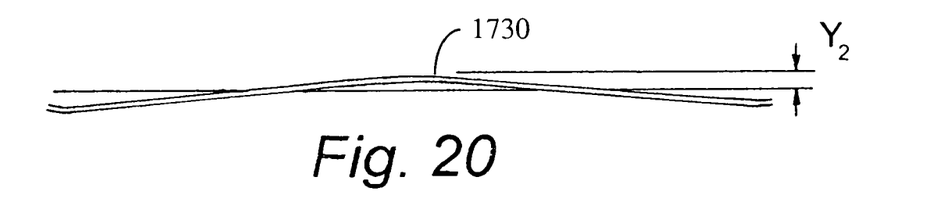
FIG. 20 is a detail of one half of a wave having a medium-small amplitude.
Figure 21:
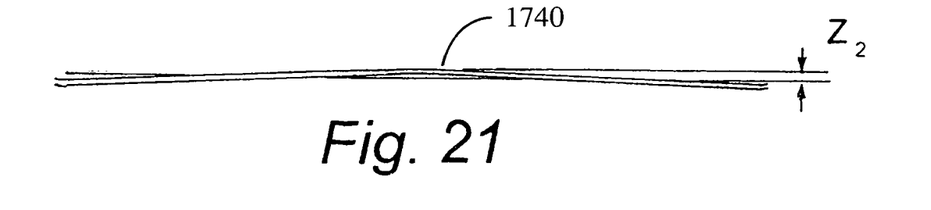
FIG. 21 is a detail of one half of a wave having a small amplitude.
Figure 22:
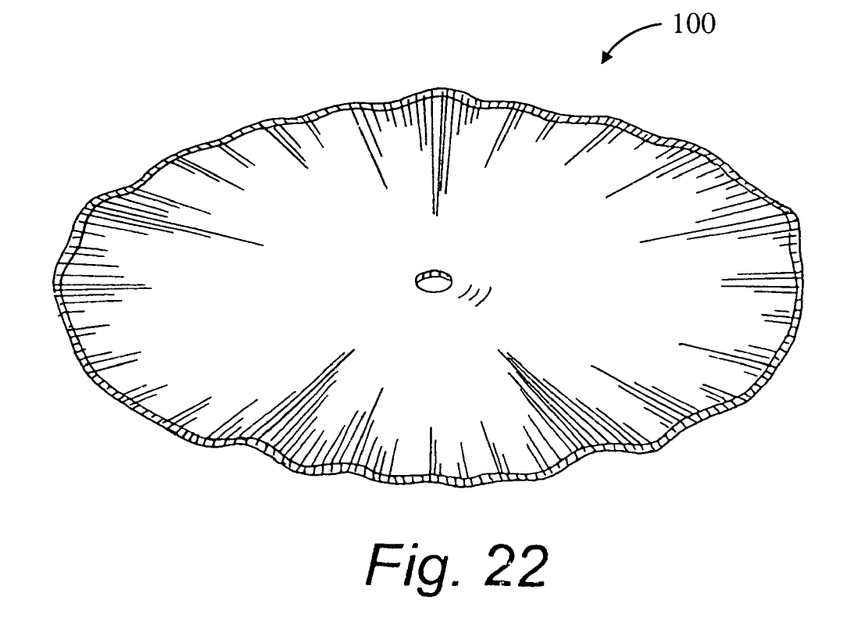
FIG. 22 is a perspective view of the variable wave coulter having four maximum amplitudes of the deviations from flat.

The four maximum amplitudes 1710, 1720, 1730, 1740 are clearly seen in FIG. 17 which illustrates a segment of the periphery of the variable wave coulter 100 of this second embodiment. Crests having the largest amplitude 1710, the medium-large amplitude 1720, the medium-small amplitude 1730, and the smallest amplitude 1740 are shown in FIGS. 18-21, respectively.

Figure 23:
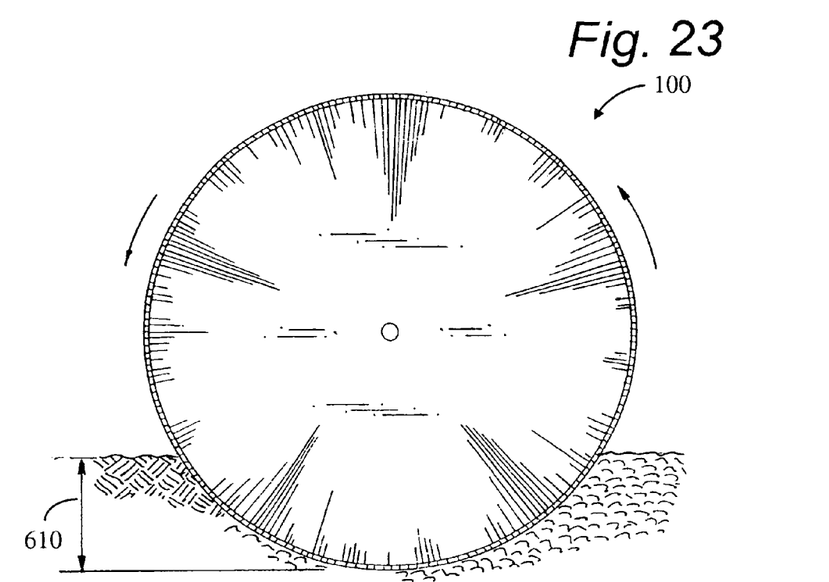
FIG. 23 is a side elevational view of the variable wave coulter having four maximum amplitudes of the deviations from flat shown in operation in soil.
Figure 24:
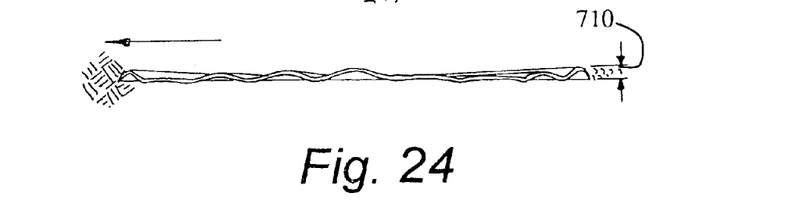
FIG. 24 is a plan view of the variable wave coulter having four maximum amplitudes of the deviations from flat in use.

The variable wave coulter 100 of the third embodiment is shown in FIGS. 23 and 24 in use loosening soil to the depth 610 and width 710 shown.

Figure 25:
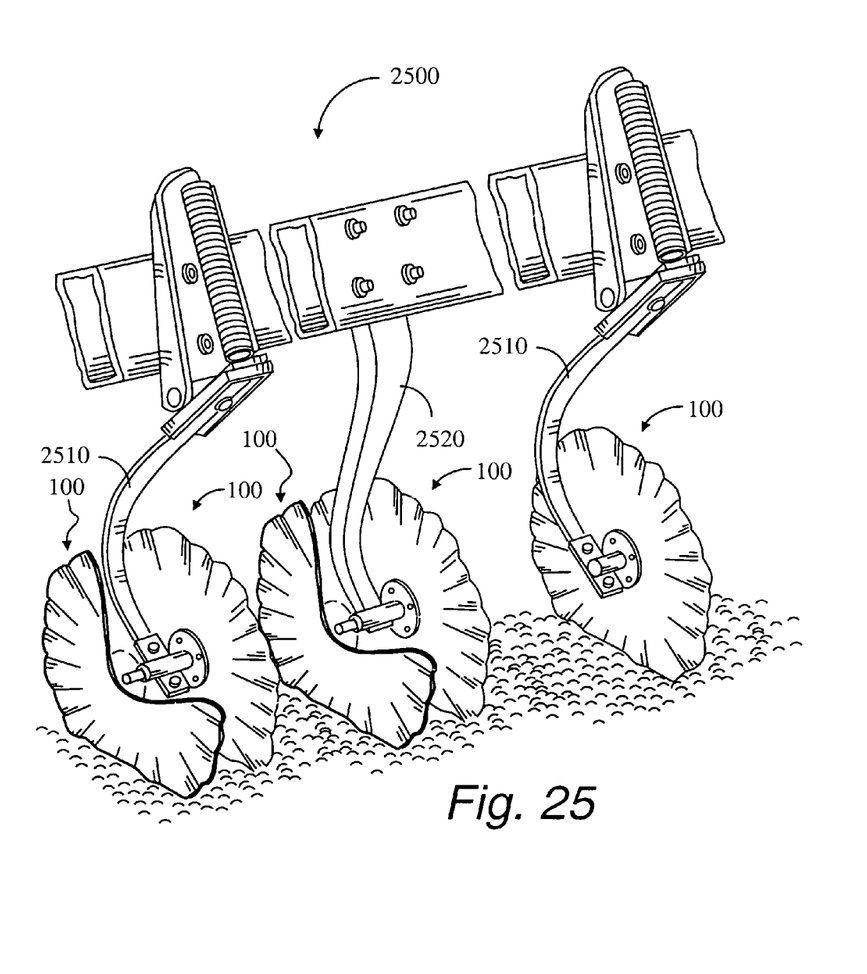
FIG. 25 is a perspective view of a plurality of wavy coulters in use on an implement.

In FIG. 25, various variable wave coulters 100 and their mounting hardware are shown attached to tillage equipment 2500, such as used in agriculture and construction. Examples of such equipment include plows, cultivators, planters, and anhydrous ammonia applicators, but the present invention is not limited to these examples. The outer sets of variable wave coulters 100 are mounted on spring shanks 2510, whereas the center set is mounted on a solid shank 2520. A plurality of the variable wave coulters 100 may be mounted on each shank 2510, 2520 as shown on the left two shanks 2510, 2520 of FIG. 25, or a single variable wave coulter 100 may be mounted on each shank 1710, 1720 as shown on the rightmost shank 2510 of FIG. 25.

Obviously, many modifications and variations of the present invention are possible in light of the above teachings. It is therefore to be understood that, within the scope of the appended claims, the invention may be practiced otherwise than as specifically described.

I claim:

1. A method of improving an operation of a wavy coulter, said wavy coulter having a rotational axis and an outer periphery disposed radially outwardly from the rotational axis, said method comprising:
   (a) selecting a wavy coulter wherein the outer periphery is disposed at a substantially constant radius about an entire three hundred and sixty degrees of the wavy coulter;
   (b) selecting a plurality of distinct amplitudes of deviations from flat;
   (c) shaping the wavy coulter such that the outer periphery of the wavy coulter deviates from flat in a plurality of waves, each wave comprising a crest and a valley entirely around the outer periphery of the wavy coulter;
   (d) providing a maximum deviation from flat for each crest and each valley equal to one of the plurality of distinct amplitudes at the outer periphery thereof; and
   (e) assuring that at least one wave exhibits a maximum deviation of each of the plurality of distinct amplitudes at the outer periphery thereof.

2. The method of claim 1 wherein the deviations from flat are deviations from a plane in which the outer periphery of a flat coulter resides.

3. The method of claim 1 additionally comprising arranging the crest and valley of a given wave adjacent to one another.

4. The method of claim 1 additionally comprising arranging the plurality of waves to be periodic in angle around the outer periphery of the variable wave coulter.

5. The method of claim 1 additionally comprising extending each crest and valley inward from the outer periphery in respective lines disposed at a predetermined acute angle with respect to a radial line.

6. The method of claim 1 additionally comprising extending each crest and valley inward from the outer periphery in respective radial lines.

7. The method of claim 1 additionally comprising:
   (a) rolling the variable wave coulter in soil; and
   (b) loosening said soil by action of the variable wave coulter rolling therein.

8. The method of claim 1 additionally comprising:
   (a) attaching said variable wave coulter to an implement;
   (b) rolling the variable wave coulter in soil; and
   (c) loosening said soil by action of the variable wave coulter rolling therein.

9. The method of claim 8 wherein attaching said variable wave coulter to an implement comprises attaching said variable wave coulter to a farm implement.

10. The method of claim 8 wherein attaching said variable wave coulter to an implement comprises attaching said variable wave coulter to construction equipment.

11. The method of claim 1 wherein an amplitude of each wave is represented by a function of angle about the rotational axis of the wavy coulter, and wherein said function has a continuous first derivative with respect to the angle.

12. The method of claim 1 wherein said wavy coulter comprises an axis of rotation and extends to the outer periphery relative to the axis of rotation, and wherein shaping the wavy coulter comprises shaping the wavy coulter such that the wavy coulter deviates from flat in a plurality of waves at the outer periphery, each wave comprising a crest and a valley.

13. A variable wave coulter comprising:
(a) a rotational axis and an outer periphery disposed radially outwardly from the rotational axis;
(b) a substantially constant radius about an entire three hundred and sixty degrees of the outer periphery thereof;
(c) a plurality of waves formed by deviating the entire outer periphery of the variable wave coulter from a flat plane;
(d) a plurality of crests and a plurality of valleys, wherein each of said plurality of waves comprises one crest and one valley at the outer periphery thereof; and
(e) a plurality of distinct amplitudes, wherein at least one of said plurality of waves exhibits a maximum deviation of each of the plurality of distinct amplitudes at the outer periphery thereof.

14. The variable wave coulter of claim 13 wherein deviations from flat are deviations measured from a plane in which the outer periphery of a flat coulter resides.

15. The variable wave coulter of claim 13 wherein the crest and valley of a given wave are arranged circumferentially adjacent to one another.

16. The variable wave coulter of claim 13 additionally comprising a period whereby the plurality of waves are arranged periodically around the periphery of the variable wave coulter.

17. The variable wave coulter of claim 13 additionally comprising a center aperture by which the variable wave coulter is operatively attached to a hub for rolling the variable wave coulter in soil.

18. The variable wave coulter of claim 13 additionally comprising:
(a) wherein said variable wave coulter exists at the entire outer periphery; and
(b) a plurality of waves formed at the outer periphery by deviating the variable wave coulter from a flat plane.

19. The variable wave coulter of claim 13 wherein an amplitude of each of the plurality of waves is represented by a function of angle about an axis of rotation of the wavy coulter, and wherein said function has a continuous first derivative with respect to the angle.

20. A method of improving an operation of a wavy coulter, said wavy coulter having an axis of rotation and extending to an entire outer periphery of a substantially constant radius about three hundred and sixty degrees relative to the axis of rotation, said method comprising:
(a) selecting a plurality of distinct amplitudes of deviations from flat;
(b) shaping the wavy coulter such that the wavy coulter deviates from flat in a plurality of waves around the entire outer periphery thereof, each wave comprising a crest and a valley;
(c) providing a maximum deviation from flat for each crest and each valley equal to one of the plurality of distinct amplitudes; and
(d) assuring that at least one wave exhibits a maximum deviation of each of the plurality of distinct amplitudes.

21. The method of claim 20 wherein deviations from flat are deviations from a plane.

22. The method of claim 20 additionally comprising arranging the crest and valley of a given wave adjacent to one another.

23. The method of claim 20 additionally comprising arranging the plurality of waves to be periodic in angle around the variable wave coulter.

24. The method of claim 20 additionally comprising extending each crest and valley inwardly from the outer periphery in respective lines disposed at a predetermined acute angle with respect to a curve of constant radius.

25. The method of claim 20 additionally comprising extending each crest and valley inwardly from the outer periphery in respective radial lines.

26. The method of claim 20 additionally comprising:
(a) rolling the variable wave coulter in soil; and
(b) loosening said soil by action of the variable wave coulter rolling therein.

27. The method of claim 20 additionally comprising:
(a) attaching said variable wave coulter to an implement;
(b) rolling the variable wave coulter in soil; and
(c) loosening said soil by action of the variable wave coulter rolling therein.

28. The method of claim 27 wherein attaching said variable wave coulter to an implement comprises attaching said variable wave coulter to a farm implement.

29. The method of claim 27 wherein attaching said variable wave coulter to an implement comprises attaching said variable wave coulter to construction equipment.

30. A variable wave coulter comprising:
(a) a rotational axis and an entire outer periphery of a substantially constant radius about three hundred and sixty degrees of the rotational axis wherein said variable wave coulter exists at the outer periphery about the entire three hundred and sixty degrees thereof;
(b) a plurality of waves formed at the entire outer periphery by deviating the variable wave coulter from a flat plane;
(c) a plurality of crests and a plurality of valleys, wherein each of said plurality of waves comprises one crest and one valley; and
(d) a plurality of distinct amplitudes, wherein at least one of said plurality of waves exhibits a maximum deviation of each of the plurality of distinct amplitudes at the outer periphery thereof.

31. The variable wave coulter of claim 30 wherein deviations from flat are deviations measured from a plane in which a flat coulter resides.

32. The variable wave coulter of claim 30 wherein the crest and valley of a given wave are arranged circumferentially adjacent to one another.

33. The variable wave coulter of claim 30 additionally comprising a period whereby the plurality of waves are arranged periodically around the variable wave coulter.

34. The variable wave coulter of claim 30 additionally comprising a center aperture by which the variable wave coulter is operatively attached to a hub for rolling the variable wave coulter in soil.

* * * * *